United States Patent
Sakamoto et al.

(10) Patent No.: US 12,058,078 B2
(45) Date of Patent: Aug. 6, 2024

(54) INTERFERENCE AREA DETECTION METHOD FOR WIRELESS COMMUNICATION SYSTEM, INTERFERENCE AREA DETECTION SYSTEM, INTERFERENCE AREA DETECTION DEVICE, AND INTERFERENCE AREA DETECTION PROGRAM

(71) Applicant: NIPPON TELEGRAPH AND TELEPHONE CORPORATION, Tokyo (JP)

(72) Inventors: Hiroshi Sakamoto, Musashino (JP); Hiroyuki Nakamura, Musashino (JP); Tomoaki Ogawa, Musashino (JP); Makoto Umeuchi, Musashino (JP); Shinya Otsuki, Musashino (JP); Junichi Iwatani, Musashino (JP); Masayoshi Nabeshima, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 656 days.

(21) Appl. No.: 17/277,317

(22) PCT Filed: Sep. 13, 2019

(86) PCT No.: PCT/JP2019/036096
§ 371 (c)(1),
(2) Date: Mar. 18, 2021

(87) PCT Pub. No.: WO2020/059657
PCT Pub. Date: Mar. 26, 2020

(65) Prior Publication Data
US 2022/0038246 A1    Feb. 3, 2022

(30) Foreign Application Priority Data
Sep. 20, 2018 (JP) .................................. 2018-176644

(51) Int. Cl.
*H04L 5/00* (2006.01)
*H04W 28/02* (2009.01)
(Continued)

(52) U.S. Cl.
CPC .......... *H04L 5/0073* (2013.01); *H04L 5/0057* (2013.01); *H04W 28/0236* (2013.01); *H04W 72/541* (2023.01)

(58) Field of Classification Search
CPC ............. H04W 72/541; H04W 72/542; H04W 72/543; H04W 28/0236; H04W 28/0242;
(Continued)

(56) References Cited

U.S. PATENT DOCUMENTS

2019/0335445 A1* 10/2019 Forenza

FOREIGN PATENT DOCUMENTS

| JP | 2017212563 | * 11/2017 | |
| JP | 2018502276 | * 1/2018 | ............ H04W 64/00 |

OTHER PUBLICATIONS

Part 11: Wireless LAN Medium Access Control (MAC) and Physical Layer (PHY) Specifications, IEEE Std 802.11TM-2012, Mar. 29, 2012.

* cited by examiner

*Primary Examiner* — Phong La
(74) *Attorney, Agent, or Firm* — Harness, Dickey & Pierce, P.L.C.

(57) ABSTRACT

A predetermined radio base station and subordinate radio terminals detect signals (beacons) regularly transmitted by other radio base stations, transmit information about radio channels and base station identifiers of the detected signals, and position information about the radio terminals to an interference area detection device to aggregate the information and the position information as a base station-base (Continued)

station detection list and a terminal-base station detection list. The interference area detection device compares the lists, determines, for each of positions of the subordinate radio terminals to the predetermined radio base station, whether both of the signal of the predetermined radio base station and a signal of another radio base station, which cannot be detected by the predetermined radio base station, are detected or not, and determines that a position where both of the signals are detected is within an interference area if the predetermined radio base station and the other radio base station detected at the position use the same radio channel.

5 Claims, 5 Drawing Sheets

(51) Int. Cl.
*H04W 72/08* (2009.01)
*H04W 72/541* (2023.01)

(58) Field of Classification Search
CPC ............ H04W 28/0231; H04L 5/0073; H04L 5/0075; H04L 5/0058; H04L 5/0069; H04L 5/0076; H04L 5/0062; H04L 5/0057; H04L 5/0053
See application file for complete search history.

Fig. 2

(1) BASE STATION-BASE STATION DETECTION LIST

|  | RADIO CHANNEL | BASE STATION IDENTIFIER |
|---|---|---|
| AP10 | Ach | AP30 |
| ⋮ | ⋮ |  |

(2) TERMINAL-BASE STATION DETECTION LIST (RADIO CHANNEL Ach)

|  | POSITION COORDINATES | BASE STATION IDENTIFIER |  |
|---|---|---|---|
| STA11 | (X1, Y1) | AP10 | ⎫ INTERFERENCE AREA |
|  |  | AP20 | ⎭ |
|  |  | AP30 | → NON-INTERFERENCE AREA |
| STA12 | (X2, Y2) | AP10 | ⎫ INTERFERENCE AREA |
|  |  | AP20 | ⎭ |
| STA13 | (X3, Y3) | AP10 | ⎫ INTERFERENCE AREA |
|  |  | AP20 | ⎭ |
| STA14 | (X4, Y4) | AP10 |  |
| STA15 | (X5, Y5) | AP10 | → NON-INTERFERENCE AREA |
|  |  | AP30 |  |
| ⋮ | ⋮ |  |  |

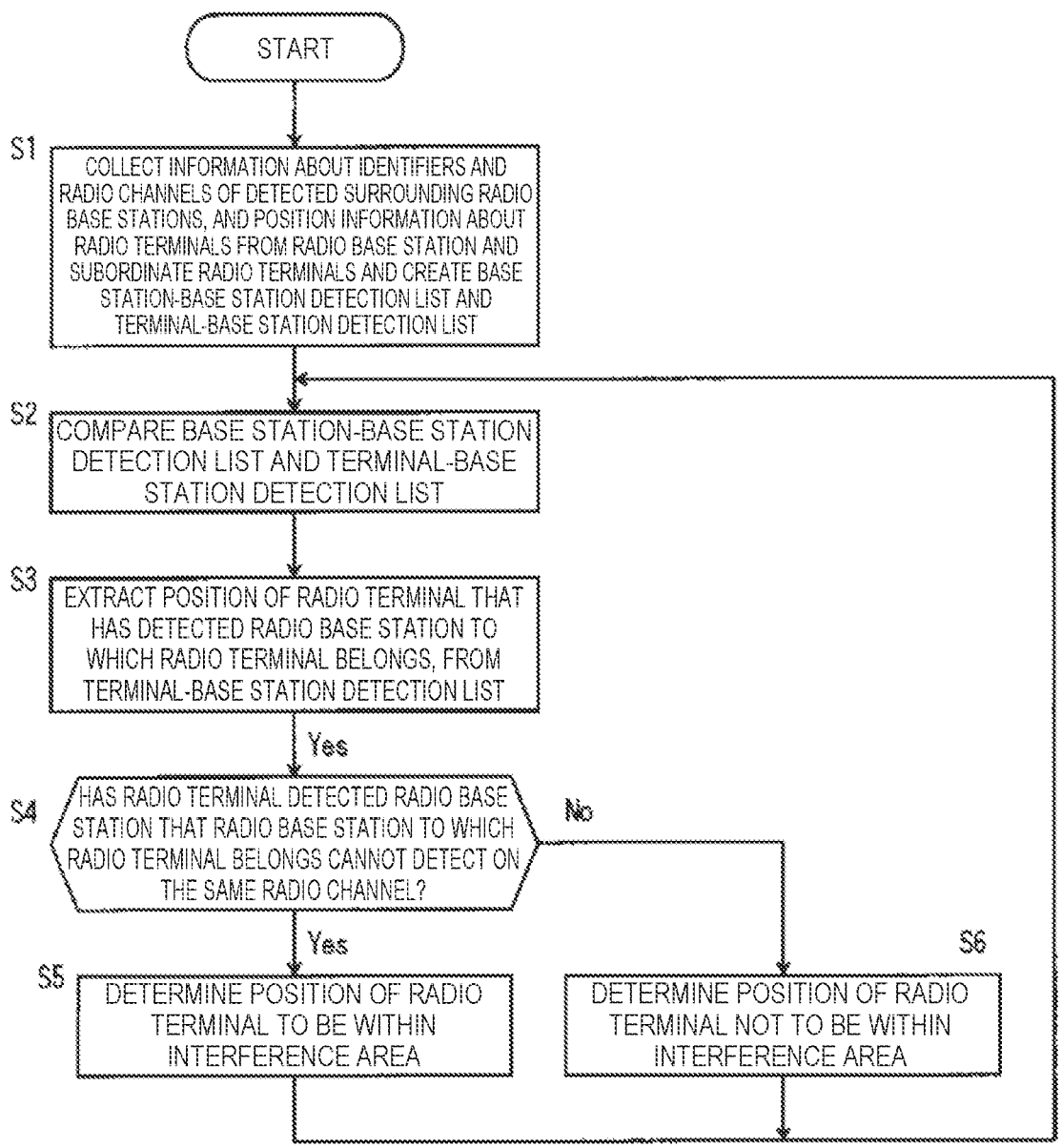

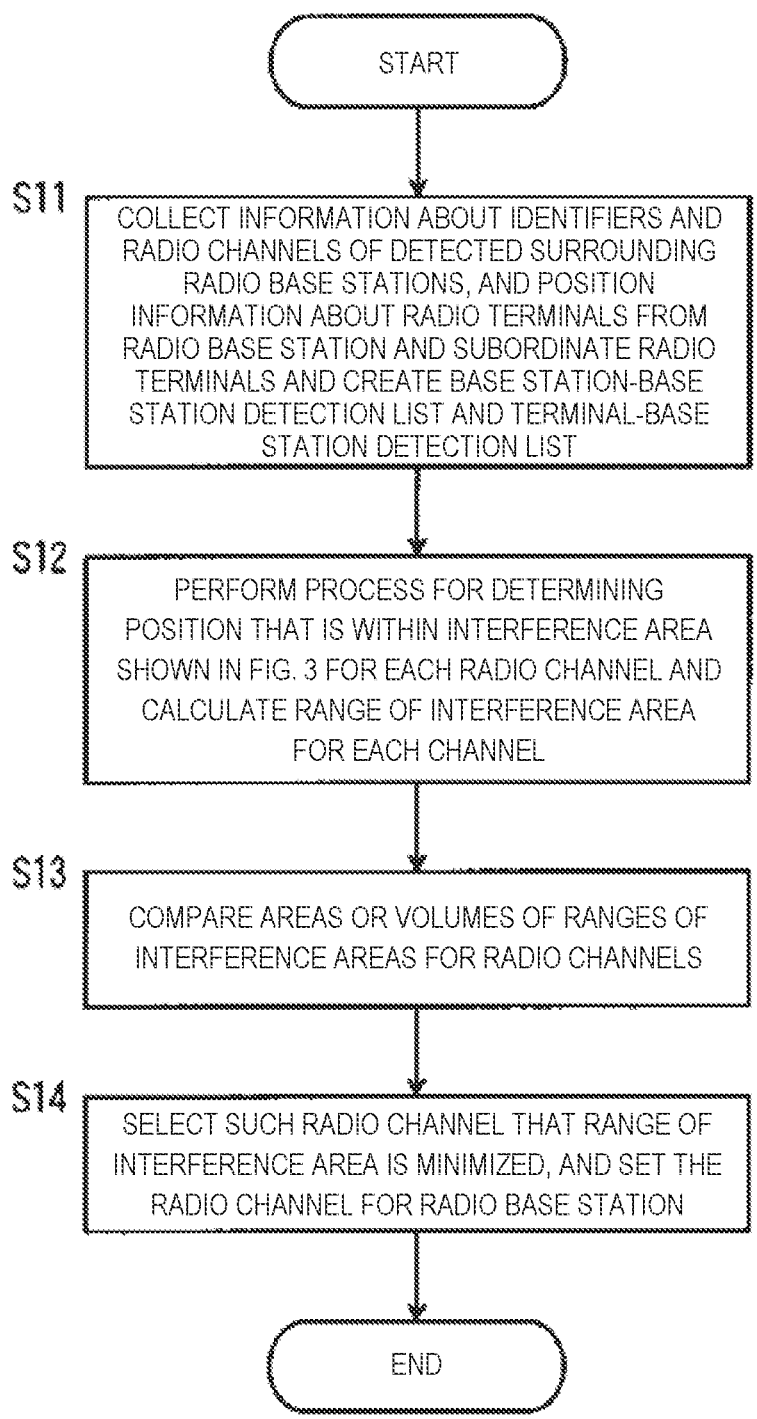

Fig. 5
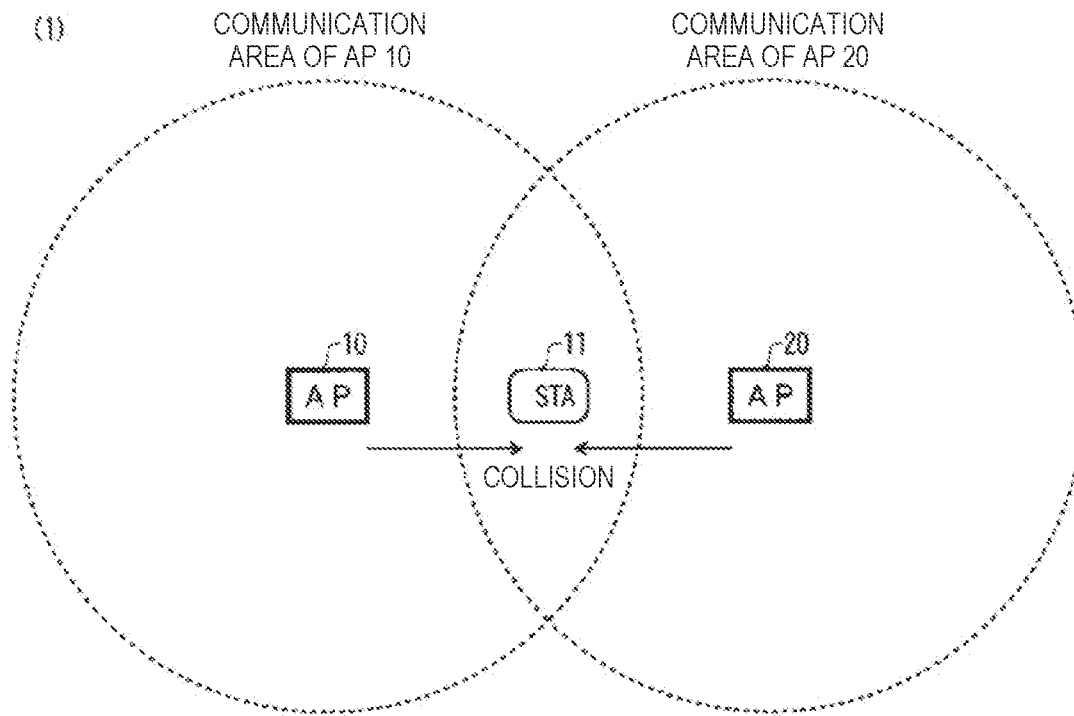
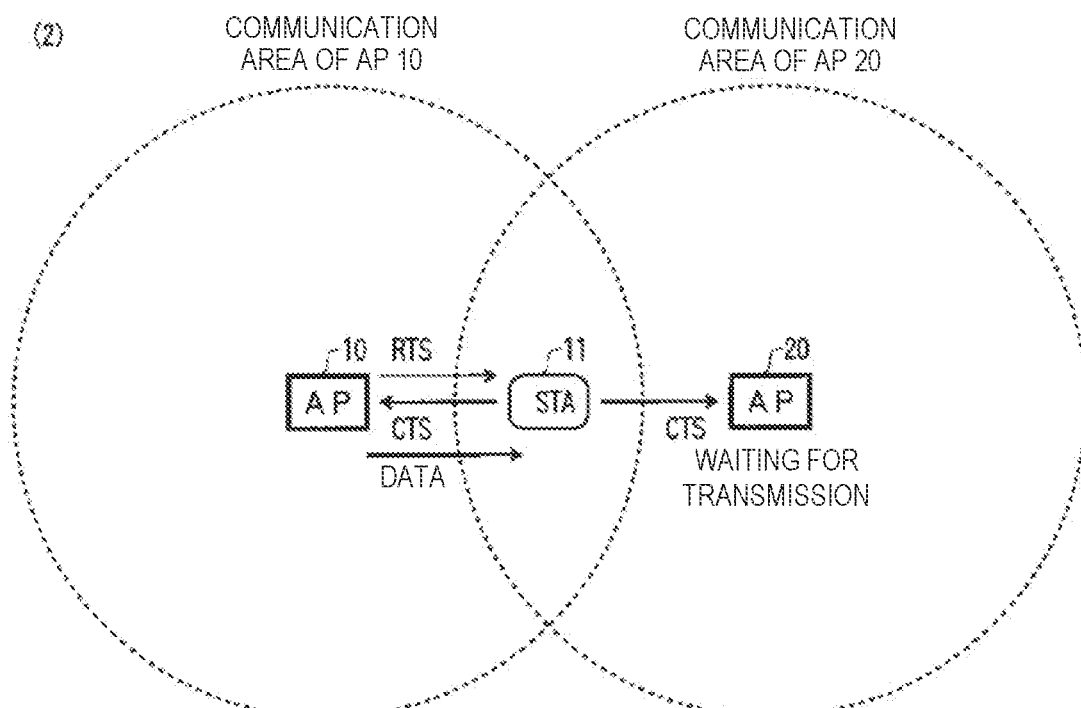

INTERFERENCE AREA DETECTION METHOD FOR WIRELESS COMMUNICATION SYSTEM, INTERFERENCE AREA DETECTION SYSTEM, INTERFERENCE AREA DETECTION DEVICE, AND INTERFERENCE AREA DETECTION PROGRAM

CROSS-REFERENCE TO RELATED APPLICATIONS

This application is a 371 U.S. National Phase of International Application No. PCT/JP2019/036096 filed on Sep. 13, 2019, which claims priority to Japanese Application No. 2018-176644 filed on Sep. 20, 2018. The entire disclosures of the above applications are incorporated herein by reference.

TECHNICAL FIELD

The present invention relates to a radio communication system interference area detection method, an interference area detection system, an interference area detection device and an interference area detection program for detecting an interference area where communication areas overlap when a plurality of radio base stations in a hidden terminal state use the same radio channel.

BACKGROUND ART

FIG. 5 shows a radio communication system in which parts of communication areas of a plurality of radio base stations overlap.

In FIG. 5(1), there are communication areas (circles shown by broken lines in FIG. 5(1)) of radio base stations (APs) 10 and 20 which are in a hidden terminal state, in which mutual radio waves cannot be detected, and a range where the communication areas overlap when the radio base stations 10 and 20 use the same radio channel is an interference area. Since a CSMA/CA (Carrier Sense Multiple Access with Collision Avoidance) scheme assumes that carriers of radio devices in the same area can be mutually detected by the radio devices, there may be a case where the radio base stations 10 and 20 in the hidden terminal state cannot detect mutual carriers and transmit signals at the same time. At this time, the signals of both of the radio base stations 10 and 20 collide at a radio terminal (STA) 11 in the interference area, and, as a result, throughput decreases. In order to reduce the signal collision due to the hidden terminal problem, a scheme of exchanging RTS/CTS frames before transmission of signals is defined in IEEE 802.11 (Non-Patent Literature 1).

As shown in FIG. 5(2), if, when RTS/CTS frames are transmitted and received between the radio base station 10, one of the radio base stations in the hidden terminal state, and a subordinate radio terminal 11, the radio base station 20, which is the other radio station, receives the CTS frame transmitted by the radio terminal 11, it is possible to avoid signal collision at the radio terminal 11 by the radio base station 20 waiting for transmission.

On the other hand, if the other radio base station 20, which is the other radio station, and a subordinate radio terminal transmit and receive signals (for example, RTS/CTS frames) earlier, the radio terminal 11 in the interference area detects the signals, waits for transmission, and enters an "exposed terminal state" in which communication with the radio base station 10 to which the radio terminal 11 belongs is restricted, and throughput decreases.

Thus, when a radio terminal in an interference area that occurs when radio base stations in a hidden terminal state use the same radio channel performs CSMA/CA control, the radio terminal is in the "exposed terminal state" of being caused to wait for transmission by a signal from a radio base station in the hidden terminal state. Therefore, the interference area may be referred to as an "exposed area".

CITATION LIST

Non-Patent Literature

Non-Patent Literature 1: IEEE Std 802.11 TM 2012

SUMMARY OF THE INVENTION

Technical Problem

Throughput of a radio terminal, which is in an exposed terminal state in an interference area that occurs when a plurality of radio base stations in a hidden terminal state use the same radio channel, decreases. At this time, if intensity of reception of a radio wave from a radio base station to which the radio terminal belongs is sufficient, radio wave intensity indication of the subordinate radio terminal shows being normal, and a user cannot recognize that the radio terminal is in the exposed terminal state. Further, it is also difficult for the user of the radio terminal and an administrator of the radio base station to grasp the place and range of the interference area.

The present invention aims to a radio communication system interference area detection method capable of detecting an interference area that occurs when a plurality of radio base stations in a hidden terminal state use the same radio channel and minimizing the interference area where a radio terminal is in an exposed state, an interference area detection system, an interference area detection device and an interference area detection program.

Means for Solving the Problem

A first invention is a radio communication system interference area detection method for detecting an interference area where communication areas of radio base stations using the same radio channel overlap, in a radio communication system in which each of a plurality of radio base stations communicates with subordinate radio terminals, the radio communication system interference area detection method including: Step 1 of a predetermined radio base station among the plurality of radio base stations detecting signals (beacons) regularly transmitted by the other radio base stations, and transmitting information about radio channels and base station identifiers of the detected signals to an interference area detection device to aggregate the information as a base station-base station list; Step 2 of subordinate radio terminals to the predetermined radio base station detecting signals (beacons) regularly transmitted by the predetermined radio base station and the other radio base stations, and transmitting information about radio channels and base station identifiers of the detected signals and position information about the radio terminals to the interference area detection device via the predetermined radio base station to aggregate the information as a terminal-base station detection list; and Step 3 of the interference area detection device comparing the base station-base station detection list and the terminal-base station detection list, determining, for each of positions of the subordinate radio terminals to the predetermined radio base station, whether both of the signal of the predetermined radio base station and a signal of another radio base station, which cannot be detected by the predetermined radio base station, are detected or not, and determining that a position where both of the signals are detected is within the interference area if the predetermined radio base station and the other radio base station detected at the position use the same radio channel.

In the radio communication system interference area detection method of the first invention, the Step 3 is executed for each of radio channels that the predetermined radio base station can use; positions of radio terminals to be within an interference area for the predetermined radio base station and a radio base station that is in a hidden terminal state are extracted; such a radio channel that a range surrounded by the extracted positions of the radio terminals is minimized is selected; and the selected radio channel is set as a radio channel to be used by the predetermined radio base station.

A second invention is an interference area detection system that detects an interference area where communication areas of radio base stations using the same radio channel overlap, in a radio communication system in which each of a plurality of radio base stations communicates with subordinate radio terminals, the interference area detection system including an interference area detection device that aggregates information about radio channels and base station identifiers of signals (beacons) regularly transmitted by radio base stations other than a predetermined radio base station among the plurality of radio base stations, as a base station-base station detection list, the signals (beacons) being detected by the predetermined radio base station, and aggregates information about radio channels and base stations identifiers of signals (beacons) regularly transmitted by the predetermined radio base station and the other base stations, and position information about subordinate radio terminals to the predetermined radio base station, as a terminal-base station detection list, via the predetermined radio base station, the signals (beacons) being detected by the subordinate radio terminals to the predetermined radio station; wherein the interference area detection device is configured to compare the base station-base station detection list and the terminal-base station detection list, determine, for each of positions of the subordinate radio terminals to the predetermined radio base station, whether both of the signal of the predetermined radio base station and a signal of another radio base station, which cannot be detected by the predetermined radio base station, are detected or not, and determine that a position where both of the signals are detected is within the interference area if the predetermined radio base station and the other radio base station detected at the position use the same radio channel.

A third invention is an interference area detection device that detects an interference area where communication areas of radio base stations using the same radio channel overlap, in a radio communication system in which each of a plurality of radio base stations communicates with subordinate radio terminals, the interference area detection device including: means for aggregating information about radio channels and base station identifiers of signals (beacons) regularly transmitted by radio base stations other than a predetermined radio base station among the plurality of radio base stations, as a base station-base station detection list, the signals (beacons) being detected by the predetermined radio base station, and aggregating information about radio channels and base stations identifiers of signals (beacons) regularly transmitted by the predetermined radio base station and the other base stations, and position information about subordinate radio terminals to the predetermined radio base station, as a terminal-base station detection list, via the predetermined radio base station, the signals (beacons) being detected by the subordinate radio terminals to the predetermined radio station; and means for comparing the base station-base station detection list and the terminal-base station detection list, determining, for each of positions of the subordinate radio terminals to the predetermined radio base station, whether both of the signal of the predetermined radio base station and a signal of another radio base station, which cannot be detected by the predetermined radio base station, are detected or not, and determining that a position where both of the signals are detected is within the interference area if the predetermined radio base station and the other radio base station detected at the position use the same radio channel.

An interference area detection program of a fourth invention causes a computer to execute a process executed by the interference area detection device of the third invention to detect the interference area.

Effects of the Invention

Since the present invention uses signals (beacons) regularly transmitted by radio base stations, it is possible to detect an interference area (an exposed area) that occurs when radio base stations in a hidden terminal state use the same radio channel without consuming a communication band for radio services, and provide the interference area for a base station administrator and a user. Furthermore, since it is possible to select a radio channel that minimizes the interference area (the exposed area), it is possible to contribute to improvement of communication quality.

BRIEF DESCRIPTION OF DRAWINGS

FIG. 2 is a diagram showing an example of each detection list on a radio channel Ach.

FIG. 3 is a flowchart showing a processing procedure example of an interference area detection method of the present invention.

FIG. 4 is a flowchart showing an example of a processing procedure for minimizing an interference area.

FIG. 5 is a diagram showing a radio communication system in which parts of communication areas of a plurality of radio base stations overlap.

DESCRIPTION OF EMBODIMENT

Figure 1:
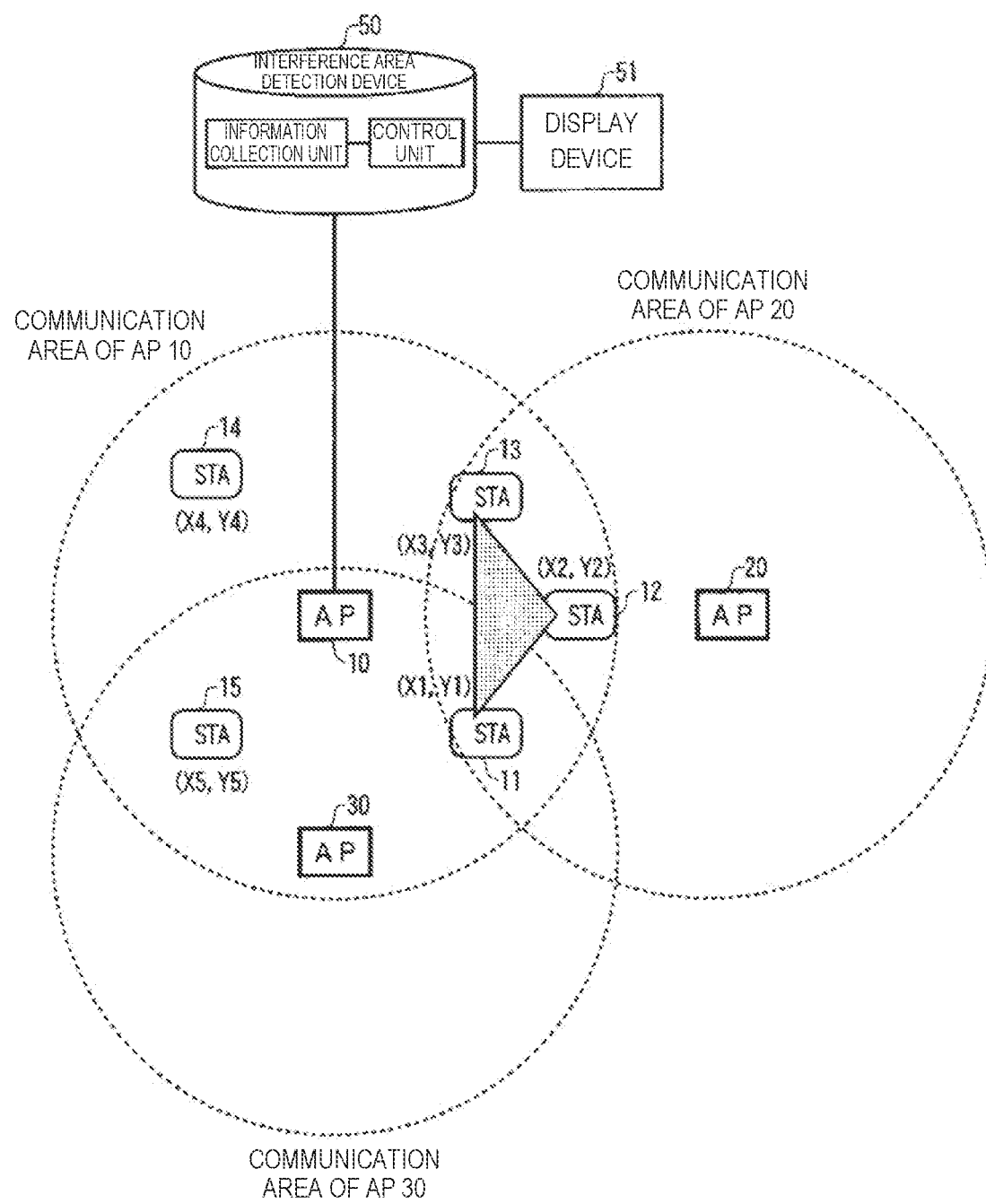
FIG. 1 is a diagram showing a configuration example of an interference area detection system of the present invention.

FIG. 1 shows a configuration example of an interference area detection system of the present invention.

In FIG. 1, in a communication area (a circle shown by a broken line in FIG. 1) of a management target radio base station (AP) 10, a plurality of subordinate radio terminals (STAs) 11, 12, 13, 14 and 15 exist. Note that the plurality of radio terminals may refer to mutually different radio terminals existing at the same time or may be one or more radio terminals existing within a certain time while moving.

There are radio base stations (APs) 20 and 30, which are not management targets, around the radio base station 10, and there is an area where communication areas of the radio base stations overlap. When a radio base station (20, here) that is in a hidden terminal state relative to the radio base station 10 uses the same radio channel, a range where the communication areas of the radio base stations 10 and 20 overlap is an interference area (an exposed area).

To the management target radio base station 10, an interference area detection device (a server) 50 is connected via any arbitrary wired or wireless network. The interference area detection device 50 is provided with an information collection unit and a control unit that perform processes shown below, and a display device 51 is connected outside.

Here, it is assumed that a position of the radio base station 10 is (Xap1, Yap1), a position of the radio base station 20 is (Xap2, Yap2), and a position of the radio base station 30 is (Xap3, Yap3). The radio base stations 10 and 20 exist outside the communication areas of the radio base stations 20 and 10, respectively, and are mutually in the hidden terminal state. On the other hand, the radio base stations 10 and 30 exist inside both of their communication areas and can detect mutual signals, and they are not in the hidden terminal state.

It is assumed that positions of the radio terminals 11, 12, 13, 14 and 15 are (X1, Y1), (X2, Y2), (X3, Y3), (X4, Y4) and (X5, Y5), respectively. Each of the positions here is indicated by two-dimensional coordinates. Note that each of the radio terminals 11 to 15 has a function of detecting position coordinates of the radio terminal using means such as a GPS, a BLE beacon, a radio wave intensity detector, a camera and a depth sensor.

The radio base station 10 detects signals (beacons) regularly transmitted by the other radio base stations, and transmits information about radio channels and base station identifiers of the detected signals to the interference area detection device 50. In the interference area detection device 50, the base station identifiers and radio channels detected by the management target radio base station 10 are aggregated as a "base station-base station detection list".

FIG. 2 (1) shows an example of the "base station-base station detection list". In the positional relationship shown in FIG. 1, the management target radio base station 10 detects a beacon of the radio base station 30 on a radio channel Ach. From this "base station-base station detection list", it is seen that the radio base station 10 has not detected the radio base station 20 on the radio channel Ach, and the "base station-base station detection list" is used for determination of an interference area (an exposed area) to be described later. The "base station-base station detection list" is aggregated for other management target radio base stations and other radio channels similarly.

Each of the subordinate radio terminals 11 to 15 to the radio base station 10 detects signals (beacons) regularly transmitted by the radio base station 10 and the other radio base stations 20 and 30, and transmits information about radio channels and base station identifiers of the detected signals and position information about the radio terminal to the interference area detection device 50 via the radio base station 10. The interference area detection device 50 aggregates the base station identifiers detected at positions of the radio terminals for each radio channel, as a "terminal-base station detection list".

FIG. 2 (2) shows an example of the "terminal-base station detection list" for the radio channel Ach. In the positional relationship shown in FIG. 1, the radio base stations 10, 20 and 30 are detected at the position (X1, Y1) of the radio terminal 11. At the position (X2, Y2) of the radio terminal 12 and the position (X3, Y3) of the radio terminal 13, the radio base stations 10 and 20 are detected. At the position (X4, Y4) of the radio terminal 14, only the radio base station 10 is detected. At the position (X5, Y5) of the radio terminal 15, the radio base stations 10 and 30 are detected. The "terminal-base station detection list" is aggregated for the other management target radio base stations and the other radio channels similarly.

FIG. 3 shows a processing procedure example of an interference area detection method of the present invention.

In FIG. 3, from the radio base station 10 and the subordinate radio terminals 11 to 15, the interference area detection device 50 regularly collects information about identifiers and radio channels of detected surrounding radio base stations and position information about the radio terminals, and creates the "base station-base station detection list" and the "terminal-base station detection list" (S1). Next, the interference area detection device 50 compares the "base station-base station detection list" and the "terminal-base station detection list" (S2) and determines, for each of the positions of the radio terminals 11 to 15, whether the position is within an interference area or not when each radio base station uses the same radio channel (S3 to S6).

First, the interference area detection device 50 extracts a position of a radio terminal that has detected a radio base station to which the radio terminal belongs, from the "terminal-base station detection list" (S3), and determines whether or not the radio terminal has detected another radio base station that the radio base station to which the radio terminal belongs cannot detect, on the same radio channel as the radio base station to which the radio terminal belongs, at the position of the radio terminal (S4). At this time, the "base station-base station detection list" is referred to.

Here, the position of the radio terminal that has detected the other radio base station that the radio base station to which the radio terminal belongs cannot detect, on the same radio channel as the radio base station to which the radio terminal belongs (S4: Yes) is determined to be within the interference area if a radio base station in the hidden terminal state uses the radio channel (S5). On the other hand, positions other than the position (S4: No) are determined not to be within the interference area even if both of the radio base stations use the radio channel.

In the positional relationship shown in FIG. 1, the radio terminal 11 detects the radio base station 10 to which the radio terminal 11 belongs and the other radio base stations 20 and 30 at the radio channel Ach in the position (X1, Y1). At the same time, it is known that the radio base stations 10 and 20 are in the hidden terminal state, because the radio base station 10 cannot detect the radio base station 20, Therefore, the position (X1, Y1) of the radio terminal 11 is within the interference area when the radio base stations 10 and 20 use the radio channel Ach. On the other hand, since the radio base stations 10 and 30 are at positions where they can detect each other, CSMA/CA control functions, and the position (X1, Y1) of the radio terminal 11 is not within the interference area between the radio base stations 10 and 30. The position (X5, Y5) of the radio terminal 15 is not within the interference area, either. Furthermore, when the radio base stations 20 and 30 use a radio channel other than Ach, differently from the radio base station 10, the position (X1, Y1) of the radio terminal 11 is not within the interference area, either.

At the position (X2, Y2) of the radio terminal 12 and the position (X3, Y3) of the radio terminal 13, each of the radio terminals detects the radio base station 10 to which the radio terminal belongs on the radio channel Ach, and the radio base station 10 cannot detect the radio base station 20. Therefore, it is known that the radio base stations 10 and 20 are in the hidden terminal state. Therefore, the position (X2, Y2) of the radio terminal 12 and the position of (X3, Y3) of the radio terminal 13 are within the interference area when the radio base stations 10 and 20 use the radio channel Ach.

Since the radio terminal 14 detects only the radio base station 10 on the radio channel Ach, the position (X4, Y4) of the radio terminal 14 is not within the interference area even if the radio base stations 10, 20 and 30 use the radio channel Ach.

From the above, it is seen that, when the radio base stations 10 and 20, which are in the hidden terminal state, use the radio channel Ach, a range surrounded by the position (X1, Y1) of the radio terminal 11, the position (X2, Y2) of the radio terminal 12 and the position (X3, Y3) of the radio terminal 13 is an interference area, and the position (X4, Y4) of the radio terminal 14 and the position (X5, Y5) of the radio terminal 15 are not within the interference area.

However, for example, if the position (X4, Y4) of the radio terminal 14 is in a communication area of a radio base station X other than the radio base station 20 which is in the hidden terminal state relative to the radio base station 10, the position (X4, Y4) is within an interference area when the radio base station 10 and the other radio base station X use the same radio channel. However, this is treated separately from the interference area relative to the radio base stations 10 and 20.

Further, at least three positions are required to two-dimensionally determine the interference area, and at least four positions are required to three-dimensionally determine the interference area. By increasing the number of positions of subordinate radio terminals to a management target radio base station, it is possible to determine a range that is an interference area when a plurality of radio base stations including the management target radio base station use the same radio channel more accurately and widely. Note that, when the number of subordinate radio terminals to the management target radio base station is small, time to collect the information to be aggregated into the "base station-base station detection list" and the "terminal-base station detection list" can be prolonged.

Further, by determining three or more such positions as the position (X4, Y4) of the radio terminal 14, it is possible to identify a range which is not an interference area.

FIG. 4 shows an example of a processing procedure for minimizing an interference area.

In FIG. 4, from the predetermined radio base station 10 and the subordinate radio terminals 11 to 15, the interference area detection device 50 collects information about identifiers and radio channels of detected surrounding radio base stations and position information about the radio terminals, and creates the "base station-base station detection list" and the "terminal-base station detection list" (S11). The interference area detection device 50 performs the process for determining a position that is within the interference area shown in FIG. 3 for each radio channel, extracts positions of radio terminals that are within the interference area relative to the predetermined radio base station 10 and a radio base station in the hidden terminal state, and calculate an area or volume of a range surrounded by the extracted radio terminals (S12). The interference area detection device 50 compares the areas or volumes of the ranges of the interference areas for the radio channels (S13), selects such a radio channel that the range of the interference area is minimized, and sets the radio channel as a radio channel to be used by the radio base station 10 (S14). By setting this radio channel for the radio base station 10, the interference area detection device 50 can minimize the interference area.

The interference area detection device 50 described above can be realized by a computer and a computer program. This computer program can be stored into a computer-readable recording medium or can be provided via a network.

REFERENCE SIGNS LIST

10, 20, 30 Radio base station (AP)
11 to 15 Radio terminal (STA)
50 Interference area detection device
51 Display device

The invention claimed is:

1. A radio communication system interference area detection method for detecting an interference area where communication areas of radio base stations using a same radio channel overlap, in a radio communication system in which each of a plurality of radio base stations communicates with subordinate radio terminals, the radio communication system interference area detection method comprising:
   Step 1 of a predetermined radio base station among the plurality of radio base stations detecting signals (beacons) regularly transmitted by other radio base stations, and transmitting first information about radio channels and base station identifiers of the detected signals to an interference area detection device for the interference area detection device to aggregate the first information as a base station-base station list;
   Step 2 of subordinate radio terminals to the predetermined radio base station detecting signals (beacons) regularly transmitted by the predetermined radio base station and the other radio base stations, and transmitting second information about radio channels and base station identifiers of the detected signals and position information about the radio terminals to the interference area detection device via the predetermined radio base station for the interference area detection device to aggregate the second information as a terminal-base station detection list; and
   Step 3 of the interference area detection device comparing the base station-base station detection list and the terminal-base station detection list, determining, for each of positions of the subordinate radio terminals to the predetermined radio base station, whether both of the signal of the predetermined radio base station and a signal of another radio base station, which cannot be detected by the predetermined radio base station, are detected or not, and determining that a position where both of the signals are detected is within the interference area if the predetermined radio base station and the other radio base station detected at the position use the same radio channel.

2. The radio communication system interference area detection method according to claim 1, wherein
   the Step 3 is executed for each of radio channels that the predetermined radio base station can use; positions of the radio terminals to be within an interference area for the predetermined radio base station and a radio base station that is in a hidden terminal state are extracted; such a radio channel that a range surrounded by the extracted positions of the radio terminals is minimized is selected; and the selected radio channel is set as a radio channel to be used by the predetermined radio base station.

3. An interference area detection system that detects an interference area where communication areas of radio base stations using the same radio channel overlap, in a radio communication system in which each of a plurality of radio base stations communicates with subordinate radio terminals, the interference area detection system comprising:

an interference area detection device that aggregates first information about radio channels and base station identifiers of signals (beacons) regularly transmitted by radio base stations other than a predetermined radio base station among the plurality of radio base stations, as a base station-base station detection list, the signals (beacons) being detected by the predetermined radio base station, and aggregates second information about radio channels and base stations identifiers of signals (beacons) regularly transmitted by the predetermined radio base station and the other base stations, and position information about the subordinate radio terminals to the predetermined radio base station, as a terminal-base station detection list, via the predetermined radio base station, the signals (beacons) being detected by the subordinate radio terminals to the predetermined radio station; wherein the interference area detection device is configured to compare the base station-base station detection list and the terminal-base station detection list, determine, for each of positions of the subordinate radio terminals to the predetermined radio base station, whether both of the signal of the predetermined radio base station and a signal of another radio base station, which cannot be detected by the predetermined radio base station, are detected or not, and determine that a position where both of the signals are detected is within the interference area if the predetermined radio base station and the other radio base station detected at the position use the same radio channel.

4. An interference area detection device that detects an interference area where communication areas of radio base stations using the same radio channel overlap, in a radio communication system in which each of a plurality of radio base stations communicates with subordinate radio terminals, the interference area detection device comprising:

means for aggregating first information about radio channels and base station identifiers of signals (beacons) regularly transmitted by radio base stations other than a predetermined radio base station among the plurality of radio base stations, as a base station-base station detection list, the signals (beacons) being detected by the predetermined radio base station, and aggregating second information about radio channels and base stations identifiers of signals (beacons) regularly transmitted by the predetermined radio base station and the other base stations, and position information about subordinate radio terminals to the predetermined radio base station, as a terminal-base station detection list, via the predetermined radio base station, the signals (beacons) being detected by the subordinate radio terminals to the predetermined radio station; and means for comparing the base station-base station detection list and the terminal-base station detection list, determining, for each of positions of the subordinate radio terminals to the predetermined radio base station, whether both of the signal of the predetermined radio base station and a signal of another radio base station, which cannot be detected by the predetermined radio base station, are detected or not, and determining that a position where both of the signals are detected is within the interference area if the predetermined radio base station and the other radio base station detected at the position use the same radio channel.

5. A non-transitory computer-readable medium having computer-executable instructions that, upon execution of the instructions by a processor of a computer, cause the computer to function as the interference area detection device according to claim 4 to detect the interference area.

\* \* \* \* \*